United States Patent [19]

Dohlen et al.

[11] Patent Number: 4,625,766

[45] Date of Patent: Dec. 2, 1986

[54] ISOLATION AND PROTECTION DEVICE FOR WORKING ON TUBING, AND IN PARTICULAR ON NUCLEAR POWER STATION TUBING

[75] Inventors: Gérard Dohlen, Ecuelle; Jean-Claude Le Marquis, Moret sur Loing; Claude Oberlin, Avon, all of France

[73] Assignee: Electricite de France, France

[21] Appl. No.: 591,428

[22] Filed: Mar. 20, 1984

[30] Foreign Application Priority Data

Mar. 24, 1983 [FR] France .................................. 83 04837

[51] Int. Cl.⁴ ............................................ F16L 55/12
[52] U.S. Cl. ...................................... 138/93; 138/94; 376/203
[58] Field of Search ....................... 376/203, 403, 463; 138/89, 93, 94, 97, 98

[56] References Cited

U.S. PATENT DOCUMENTS

| | | | |
|---|---|---|---|
| 417,894 | 12/1889 | Winchester | 138/98 |
| 1,695,187 | 12/1928 | Goodman | 138/94 |
| 2,487,991 | 11/1949 | Stephens . | |
| 2,559,564 | 7/1951 | Sperling | 138/93 |
| 3,537,483 | 11/1970 | Teague | 138/93 |
| 3,593,749 | 7/1971 | Reardon | 138/93 |
| 4,172,472 | 10/1979 | Parrish | 138/97 |

FOREIGN PATENT DOCUMENTS

| | | | |
|---|---|---|---|
| 212715 | 3/1924 | United Kingdom | 138/97 |
| 374649 | 6/1932 | United Kingdom | 138/94 |
| 383379 | 11/1932 | United Kingdom . | |
| 540775 | 10/1941 | United Kingdom . | |
| 2126352 | 3/1984 | United Kingdom | 138/97 |

Primary Examiner—Charles T. Jordan
Assistant Examiner—Richard Klein
Attorney, Agent, or Firm—McCormick, Paulding & Huber

[57] ABSTRACT

An isolation and protection device is suitable for being inserted and deployed inside tubing, in order, in particular, to collect swarf and foreign bodies during work on tubing which must be kept under a controlled gas atmosphere, or to act as a flow plug or as a heat shield. The device comprises:

a central shaft (100);

a deformable sealing member (300) suitable for assuming the inside shape of the tubing;

a plurality of arms (200) which are regularly distributed around the shaft and which are collapsible thereagainst to enable the device to be inserted into the tubing; one end (230) of each arm supporting the sealing member and the other end (210) of each arm being hinged to a common base (220);

mechanical clamping means (110-150) connected to the shaft and to the base for deploying the device and for pressing the sealing member against the inside surface of the tubing whose shape it is to assume; and two sheets (400, 410) each having its periphery supported by said sealing member, and at least one of said sheets (410) being suitable for hermetically isolating the volumes which it delimits.

8 Claims, 5 Drawing Figures

ISOLATION AND PROTECTION DEVICE FOR WORKING ON TUBING, AND IN PARTICULAR ON NUCLEAR POWER STATION TUBING

The present invention relates to a device for providing isolation and protection when performing mainentance or repair work on tubing that needs to be kept under a controlled atmosphere of inert gas during said work. This is particularly true of the sodium circuits in nuclear power stations.

Furthermore, when metalworking (e.g. cutting, milling, welding, ...) on the tubing, it is absolutely essential to recover all the swarf, splashes, etc. produced by the various machines used. Any foreign matter which might be left in the tubing after the installation is back in operation will be entrained by fluid flow along the tubing and could seriously damage various valves, pump bearings, ..., and other sensitive units in the installation.

BACKGROUND OF THE INVENTION

Up to now, the operator has carefully vacuumed all the swarf and other bits from the bottom of the tubing. This method is somewhat empirical and does not guarantee effective protection of the circuits after the installation is back in operation. Further, it is necessary to isolate, empty, and cool the portion of tubing in which the work is to be performed. All these operations are lengthy and expensive in manpower. They require the installation to be closed down for a relatively long period of time.

In other applications a scraper piston is used by inserting it at one end of the tubing and by moving it along the tubing to its other end. As it moves along, the piston sweeps any foreign matter present in the tubing. This solution, however, is only of interest for long lengths of tubing, and in any case it is difficult to use for a spot check under a controlled atmosphere, since the tubing has to be freed over its entire length and opened at both ends.

In contrast, preferred embodiments of the device provided by the present invention enable circuits to be kept under a controlled atmosphere of inert or neutral gas by sealing the tubing from its surroundings throughtout the operations. They also enable work to be performed while the tubing is still hot (after the tubing has been emptied, it remains at a temperature close to that of liquid sodium, i.e. about 180° C.) by localizing operations to the work zone and by avoiding the need for the operator to thoroughly inspect the inside of the tubing for foreign matter.

SUMMARY OF THE INVENTION

To do this, the device which is intended to be inserted and deployed inside the tubing comprises:
a central shaft;
a deformable sealing member (e.g. an inflatable seal) suitable for assuming the inside shape of the tubing;
a plurality of arms (e.g. telescopic arms of variable length having components which are subjected to thrust from springs or to pressure from pneumatic actuators), which arms are regularly distributed around the shaft and are collapsible thereagainst to enable the device to be inserted into the tubing; one end of each arm supporting the sealing member and the other end of each arm being hinged to a common base;
mechanical clamping means connected to the shaft and to the base for deploying the device and for pressing the sealing member against the inside surface of the tubing whose shape it is to assume; and
two sheets each having its periphery supported by said sealing member, and at least one of said sheets being suitable for hermetrically isolating the volumes which it delimits.

Preferably, and to enable the device to be made to fit tubing of different diameters, the central shaft is an extensible shaft having one end that constitutes a bearing point against the bottom of the tubing and having its other end supporting control means for maneuvering the mechanical clamping means.

The upper sheet then serves to collect swarf during metal-working, or as a safety net during various special manipulations, such as placing film for gamma surveillance, to prevent items from being accidentally dropped into the fluid circuit.

The two sheets are advantageously made of reinforced elastomer material.

The second (or lower) sheet serves, in the event of the first sheet being punctured for any reason, to ensure continued protection of the inside of the conduit from the surroundings, both by keeping the opening sealed and by collecting objects that may drop through the first sheet.

To enable it to be replaced, the first sheet may be fixed to the sealing member by means of a slide or zipper fastening, in which case it is the second sheet which ensures that the seal is hermetic.

In a variant, one at least of the sheets is made of a thermally refractory material. Such a device in accordance with the invention can then stop a flow of hot gas, thus acting as a heat sheild instead of, or in addition to, acting as a seal.

BRIEF DESCRIPTION OF THE DRAWING

An embodiment of the invention is described by way of example with reference to the accompanying drawing, in which.

MORE DETAILED DESCRIPTION

Figure 1:
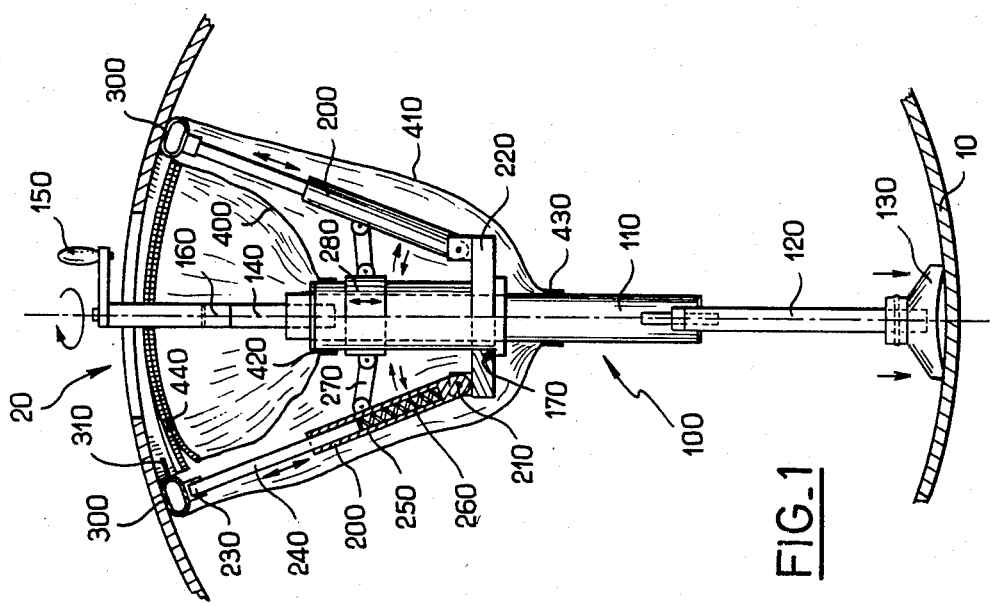
FIG. 1 is a cross section view of tubing with a device in accordance with the invention shown in partial section and extending along a diameter of the tubing.

In FIG. 1, the device in accordance with the invention is mounted inside tubing 10 which is shown in cross section. The device was inserted into the tubing via an opening 20 in the top thereof.

The device shown comprises a central shaft 100 to which a plurality of telescopic arms 200 are hinged, with one end of each arm supporting a sealing member 300 suitable for assuming the shape of the inside wall of the tubing.

The central shaft 100 comprises a central rod 110 inside which an end rod 120 is slidably mounted. The far end of the end rod 120 is fitted with an elastomer shoe 130 to prevent slipping. The length of the shaft and the consequent thrust of the shoe 130 against the bottom of the tubing are adjusted by a screw and nut assembly, the top of which is caused to rotate by a handle 150 driving a rod 140. A hinge 160 facilitates maneuvering the handle in awkward situations.

Each of the arms 200 has one of its ends hinged at 210 to a common base 220 which rests on a sholder 170 on the central shaft. The other end 230 of each arm supports a sealing member 300.

The arms are telescopic in structure: the upper portion 240 slides inside the lower portion 250, and is subjected to thrust from a spring 260. The sealing member 300 is thus permanently biased against the inside surface of the tubing whose shape it must assume.

To facilitate folded and depolying the arms, a retaining link 270 is provided between each arm and a common slide ring 280, this arrangement ensures that the arms are regularly deployed around the central shaft.

The sealing member 300 provides a hermetic seal between the inside and the outside of the tubing, and it must be capable of retaining an excess pressure of 0.1 bars inside the tubing. This seal must also be maintained even if the profile of the sealing member once in place is a compound curve. An inflatable sealing member is preferably used, with a pressure inlet valve 310 for inflating from the outside of the tubing.

The assembly supports a first sheet 400 whose role is to collect waste metal and a second sheet 410 for sealing the tubing circuit, and for providing a second line of safety in the event of the first sheet being ruptured.

At the top of the device, both sheets are supported by the sealing member 300, and the bottom of each sheet is fixed to the central shaft, e.g. by means of first and second clamps 420 and 430.

Further, since the first sheet is exposed to projections of swarf, etc., it must be readily replaceable: it is thus mounted on the sealing member 300 by a releasable fastening, e.g. by a slide or zipper fastening 440.

Figure 2:
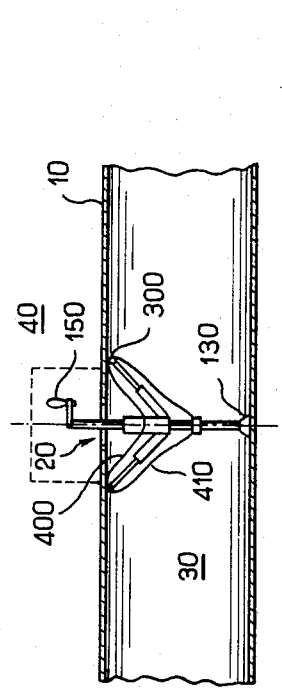
FIG. 2 is a longitudinal section view of the tubing showing the device mounted along a diameter for collecting swarf and other droppings.

FIG. 2 shows the device being used to collect swarf during a machining operation on the tubing 10, e.g. on the opening 20 itself. In this case the device is inserted vertically into the tubing through the opening 20 and with its arms folded against the shaft. The arms are then deployed under the effect of pre-inflating the sealing member 300, and the operator turns the handle 150 until the shoe 130 rests on the bottom of the conduit. The telescopic arms are then caused to extend, thus thrusting the sealing member 300 against the top of the tubing. The operator then inflates the sealing member up to nominal pressure, thus providing a total hermetic seal between the inside and the outside of the tubing (i.e. atmospheric air is kept out of the tubing by sealing the top edges of the sheets 400 and 410 around the opening 20). To ensure that there is never any possibility of outside air penetrating into the tubing, the device can be deployed from inside a glove box which constitutes an air lock. The glove box is not removed until the operator is satisfied that the device itself is properly sealed to the tubing. The large diameter of the upper sheet 400 makes it possible to perform all sorts of conventional machining operations around the opening 20, including welding from the inside.

Figure 3:
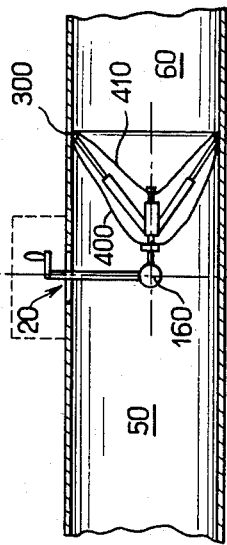
FIG. 3 is a longitudinal section through the tubing showing the device mounted axially in the tubing to stop fluid flow therealong.

FIG. 3 shows a device in accordance with the invention used as a flow plug to isolate two sections 50 and 60 of the tubing from each other. The opening 20 is kept isolated from the outside by the above-mentioned glove box, for example. In this case, the sheets 400 and 410 are preferably made of thermally refractory material such as asbestos. The sealing member 300 is this time deployed around the circumference of a substantially plane circle, and the arms are deployed from and angle member 160. Additional arms forming an articulated parallelogram may be added to increase the rigidity of the assembly.

Figure 4:
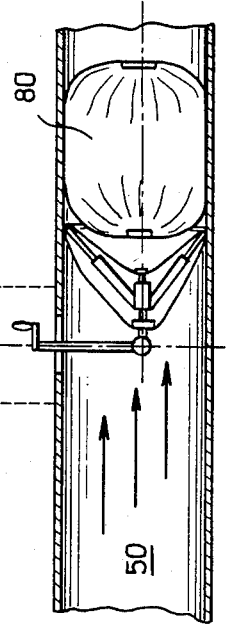
FIGS. 4 and 5 are longitudinal sections through the tubing showing the device disposed as a heat shield for protecting a balloon plug.
Figure 5:
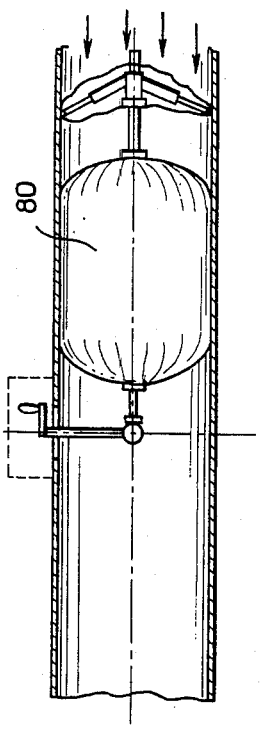

FIGS. 4 and 5 show a device in accordance with the invention deployed as shown in FIG. 3, but for use as a heat shield to protect an isolation balloon plug 80. In this case, the actual isolation of the two sections is performed by the balloon 80, so that seal member 300 need not provide such a perfect seal as in FIG. 3 example. However, the balloon must be still protected from hot material.

We claim:

1. In an isolation and protection device for insertion through an opening in the side wall of tubing and deployment to a position inside the tubing such that the opening is sealed from the interior of the tubing, said device comprising a central shaft having an inner foot end adapted to abut the tubing side wall generally opposite the opening, a base provided slidably on said shaft, a deformable sealing member of closed shape for surrounding the tubular side wall opening and adapted to assume the interior shape of the tubing around the opening, a plurality of arms distributed around the shaft means pivotably connecting ends of said arms to said base for movement between collapsed position against the shaft to enable the device to be inserted through the opening into the tubing and deployed positions wherein free ends of said arms are spaced from said shaft, said sealing member supported at the free ends of said arms, mechanical means connected to said shaft and to said base for moving the base slidably on said shaft and said arms from collapsed to deployed positions, said mechanical means also thereby pressing the sealing member against the inside surface of the tubing whose shape it is to assume and pressing the foot of said shaft against the tubing side wall opposite the opening, two sheets each of which has a periphery supported by said sealing member, one of said sheets being sealed around said base and the other of said sheets being sealed around said shaft to provide a double walled isolation device for the opening in the tubing.

2. The device according to claim 1 wherein means are provided for adjustably connecting said inner foot to said central shaft in order that the device be adaptable to different size tubing.

3. The device according to claim 1 wherein each of said arms has a telescopic portion slidably received in another arm portion, and biasing means to urge said telescopic portion of said arm away from said another portion of said telescopic arm.

4. The device according to claim 3 wherein said biasing means comprises a coiled compression spring provided inside said another arm portion.

5. The device according to claim 1 wherein said sheets are made from a reinforced elastomer material.

6. The device according to claim 1 wherein at least one of said sheets is made of a thermally refractory material.

7. The device according to claim 9 wherein a slide fastener is provided on at least one of said sheets supported by said sealing member.

8. The device according to claim 1 wherein said sealing member comprises a boot of generally annular cross section, and an inflation valve for inflating said boot.

* * * * *